United States Patent [19]

Schulze

[11] 4,363,447

[45] Dec. 14, 1982

[54] CHIP SPREADER

[76] Inventor: Clayton E. Schulze, P.O. Box 135, Corry, Pa. 16407

[21] Appl. No.: 192,847

[22] Filed: Oct. 1, 1980

[51] Int. Cl.³ .............................................. A01C 15/00
[52] U.S. Cl. ................................................... 239/659
[58] Field of Search ............... 193/2 R, 2 B; 239/659, 239/650; 222/196, 409

[56] References Cited

U.S. PATENT DOCUMENTS

| 657,419 | 9/1900 | Jager | 239/659 X |
| 878,847 | 2/1908 | Williams | 193/2 B |
| 1,833,989 | 12/1931 | Debnam et al. | 239/659 |
| 3,057,626 | 10/1962 | Van Der Lely et al. | 239/659 |

FOREIGN PATENT DOCUMENTS 651835  7/1976  U.S.S.R. .............................. 239/659

Primary Examiner—John J. Love
Assistant Examiner—Gene A. Church
Attorney, Agent, or Firm—Ralph Hammar

[57] ABSTRACT

A spreader nozzle for granular material in which the material is discharged through a grille of horizontal bars forming openings of length to height ratio such that the material will not flow through the openings under the static head of the material but will flow freely through the openings when the grille is vibrated.

7 Claims, 4 Drawing Figures

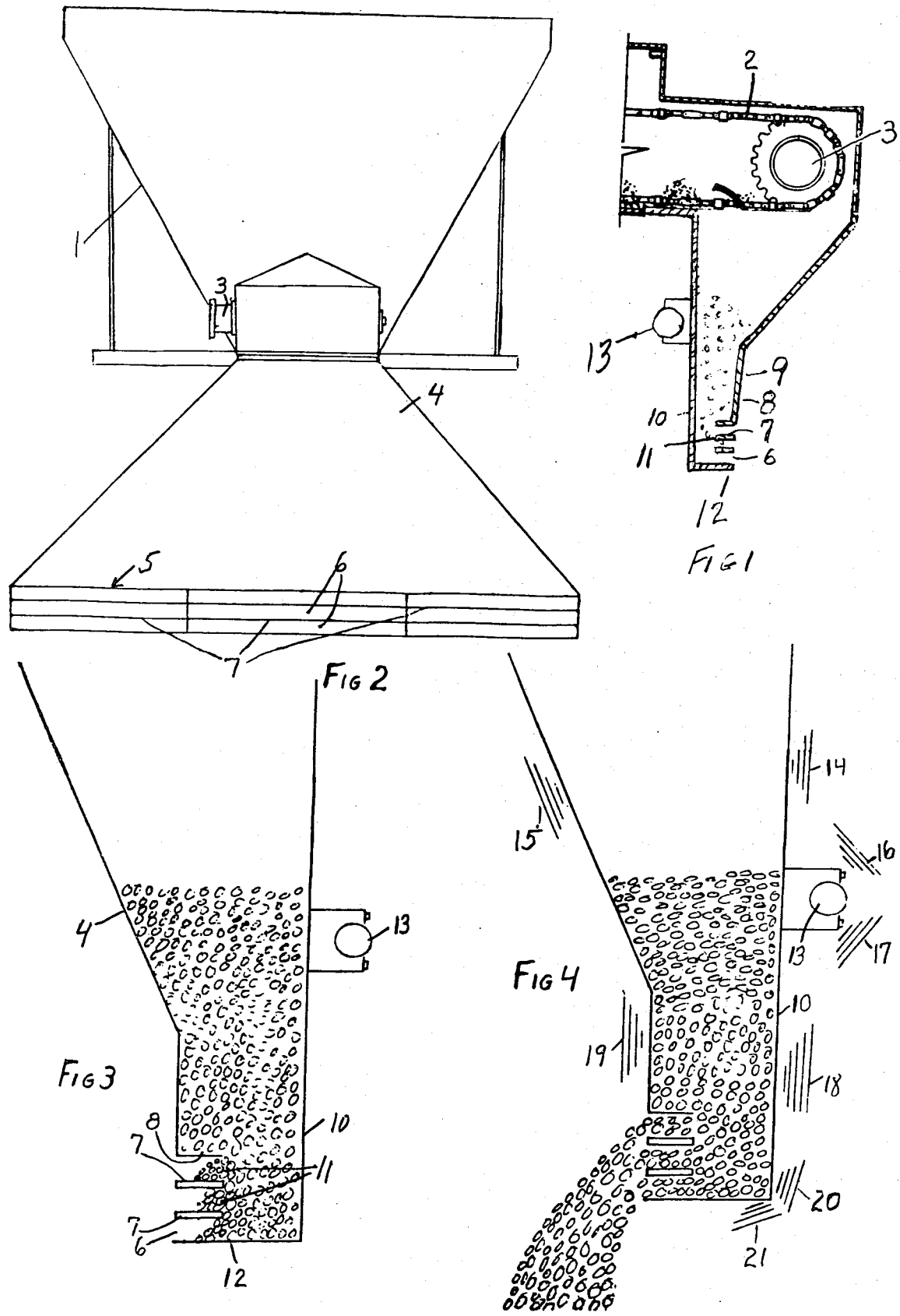

CHIP SPREADER

This invention is a spreader nozzle for stone chips and other granular material which achieves uniform spreading without moving parts. The flow of the granular material is through a grille having openings between horizontal bars crosswise of the direction of the flow with the ratio of the width of the bars to the spacing between adjacent bars such that the material will not flow through the openings under static pressure, but will flow freely when the material is vibrated.

In the drawing,

FIG. 1 is a sectional side elevation of the discharge nozzle,

FIG. 2 is a rear elevation of the nozzle and the associated spreader apparatus,

FIG. 3 is a diagrammatic view of the nozzle in the non-flowing condition, and

FIG. 4 shows the same nozzle in the flowing condition.

The spreader nozzle is applied to the structure of my application 69,582, filed Aug. 24, 1979, now U.S. Pat. No. 4,253,612 Mar. 3, 1981, incorporated by reference. As there shown in greater detail, the material from a hopper 1 is moved into discharge position by a drag link conveyor 2 driven by a motor 3. At the discharge end of the conveyor the material falls into the upper end of a discharge chute 4. As shown in FIG. 2, the chute is narrowest at its upper end and diverges downwardly and outwardly toward both sides and terminates in a discharge grille 5 at the lower or trailing end of the chute. The width of the grille is preferably somewhat greater than the width of the truck body on which a hopper 1 is carried. The height of the grille is sufficient to provide the maximum desired feed under gravity head. The openings 6 of the grille are defined by vertically horizontal bars 7 and by a bar 8 integral with trailing wall 9 of the chute. The bars 7 and 8 are all spaced from the leading wall 10 of the chute so that the leading ends 11 of the openings between the bars are always subject to the static pressure or head of the material being spread. The spacing between the lowermost bar 7 and the bottom wall 12 of the chute, the spacing between adjacent bars 7 and the spacing between the uppermost bar 7 and bar 8 are all such that under static conditions the angle of repose of the material to be spread is greater than the angle whose tangent is the spacing between adjacent bars divided by the width of the lower of the adjacent bars. This means that when the spreader is at rest (or when the spreader is mounted on a vehicle which is being driven at normal spreading speeds), none of the granular material will flow out of the discharge openings 7 of the grille even though the ends are open and unobstructed, as shown in FIG. 3. The nozzle remains "off" under static conditions and under conditions of low level vibration.

To turn the nozzle flow "on," the vibrator motor 13 is energized. The motor is attached to any suitable wall of the nozzle 4, such as wall 10, and is intentionally unbalanced so it sets up vibrations which are transmitted to the material. There is a drum effect which sets up vibrations, as indicated by the lines 14 to 21. The effect of these vibrations is to cause the material to slide along the inner surfaces of the nozzle. This is true not only for the regions indicated by the lines 14–21, but is also true for the other surfaces of the nozzle, including the bars 7, 8, 12 at the outlet of the nozzle. When the vibration is stopped, the excess material in the discharge openings 6 flows out, leaving only the material at the angle of repose, as shown in FIG. 3.

While the spreader is not adversely affected by load vibration during spreading, there is a possibility that while the load of material is being transported to the site at which it is to be spread, there may be enough load vibration to jar some material loose. If this is objectionable, it can be easily overcome by a shut-off door which would be closed during transportation.

Although the spreader nozzle is shown adapted to a spreader unit, it could be adapted to the tailgate of a standard dump truck. The tailgate would merely dump into the upper end of the spreader nozzle. Although the spreader nozzle 4 has a plurality of discharge openings, a greater or lesser number may be used. One or more discharge openings may be used. Since the flowability of granular material varies, the spacing of the bars may be varied or adjusted. The rate of spreading may be controlled varying the speed of the vibrator by varying the speed of the vehicle and by varying the opening of the grille. These are matters of design or operation.

I claim:

1. In a spreader for granular material, means for holding a mass of flowable granular material including a stationary bottom wall for supporting said mass, a lateral discharge nozzle having its leading end receiving material from a lower part of said mass and conducting the same to an outlet, an unobstructed discharge grille crosswise to the direction of flow between said inlet and outlet, said grille having its leading side in contact with a lower part of said mass and subject to the gravity head from the part of said mass above said lower part, said grille having vertically spaced bars oriented crosswise of the direction of flow through the grille, the width of the bars being such that the material will not flow through the grille under static conditions but will flow through the grille when the material is subjected to vibration by vibration means.

2. The structure of claim 1 in which the holding means is a chute.

3. The structure of claim 1 in which the angle whose tangent is the spacing between said bars divided by the width of said bars is less than the angle of repose of said material.

4. The structure of claim 1 in which the material is vibrated by vibration means in vibration transmitting relation to the grille.

5. The structure of claim 2 in which the vibration means is attached to the chute.

6. The structure of claim 1 in which the vibration means is a motor fixed to a wall of said nozzle and intentionally designed to set up vibrations which are transmitted through said wall to the material and cause the material to slide along the grille and inner surfaces of the nozzle.

7. The structure of claim 5 in which the vibration means is a motor fixed to a wall of said nozzle and intentionally designed to set up vibrations which are transmitted through said wall to the material and cause the material to slide along the grille and the inner surfaces of the nozzle.

* * * * *